United States Patent
Hayashi

(10) Patent No.: US 7,628,247 B2
(45) Date of Patent: Dec. 8, 2009

(54) ELECTRIC POWER STEERING DEVICE EQUIPPED WITH AUTOMATIC STEERING FUNCTION

(75) Inventor: Jirou Hayashi, Ama-gun (JP)

(73) Assignee: Denso Corporation, Kariya (JP)

( * ) Notice: Subject to any disclaimer, the term of this patent is extended or adjusted under 35 U.S.C. 154(b) by 354 days.

(21) Appl. No.: 11/058,649

(22) Filed: Feb. 15, 2005

(65) Prior Publication Data

US 2005/0205345 A1 Sep. 22, 2005

(30) Foreign Application Priority Data

Feb. 16, 2004 (JP) ............................. 2004-037765

(51) Int. Cl.
*B62D 5/04* (2006.01)
*B62D 6/00* (2006.01)

(52) U.S. Cl. .................... 180/446; 180/443; 701/41

(58) Field of Classification Search ................. 180/443, 180/446; 701/41; 318/432
See application file for complete search history.

(56) References Cited

U.S. PATENT DOCUMENTS

| | | | |
|---|---|---|---|
| 5,040,630 A | | 8/1991 | Morishita et al. |
| 5,086,859 A | | 2/1992 | Takahashi et al. |
| 5,261,501 A | | 11/1993 | Tsuchiya et al. |
| 5,414,627 A | * | 5/1995 | Wada et al. ..................... 701/41 |
| 5,612,877 A | * | 3/1997 | Shimizu et al. ................ 701/41 |
| 5,698,956 A | * | 12/1997 | Nishino et al. ............... 318/432 |
| 5,740,040 A | * | 4/1998 | Kifuku et al. .................. 701/41 |
| 6,107,926 A | | 8/2000 | Kifuku et al. |
| 6,129,172 A | * | 10/2000 | Yoshida et al. .............. 180/446 |
| 6,144,909 A | * | 11/2000 | Sakamaki et al. ............. 701/41 |
| 6,226,580 B1 | * | 5/2001 | Noro et al. ..................... 701/42 |
| 6,407,524 B1 | * | 6/2002 | Endo et al. .................. 318/432 |
| 6,427,104 B1 | * | 7/2002 | Matsushita et al. ............ 701/41 |
| 6,570,352 B2 | * | 5/2003 | Hara et al. ................... 318/432 |
| 6,694,237 B2 | * | 2/2004 | Kifuku et al. .................. 701/41 |
| 6,768,283 B2 | * | 7/2004 | Tanaka et al. ............... 318/632 |
| 6,778,891 B2 | | 8/2004 | Tanaka et al. |
| 7,009,358 B2 | * | 3/2006 | Tamaizumi et al. ......... 318/632 |
| 2003/0078713 A1 | | 4/2003 | Tanaka et al. |
| 2004/0226770 A1 | * | 11/2004 | Nishiyama et al. .......... 180/446 |
| 2006/0086561 A1 | * | 4/2006 | Hidaka ....................... 180/446 |

FOREIGN PATENT DOCUMENTS

| | | |
|---|---|---|
| JP | 55-001286 | 1/1980 |
| JP | 01-247272 | 10/1989 |
| JP | 03-014766 | 1/1991 |
| JP | 06-336164 | 12/1994 |

(Continued)

*Primary Examiner*—S. Joseph Morano
*Assistant Examiner*—Daniel Yeagley
(74) *Attorney, Agent, or Firm*—Harness, Dickey & Pierce, PLC

(57) ABSTRACT

An electric power steering device for automotive vehicles which is capable of minimizing a driver's steering effort. The electric power steering device is designed to perform an automatic steering control. When a steering effort has fallen within a range of steering effort within which the driver is expected to have started to turn a steering wheel intentionally, the automatic steering control is initiated. When the steering effort has been shifted from that range, the automatic steering control is deactivated. This permits the driver's steering effort to be minimized as needed by the driver.

10 Claims, 3 Drawing Sheets

FOREIGN PATENT DOCUMENTS

| | | |
|---|---|---|
| JP | 2001-260926 | 9/2001 |
| JP | 2002-225743 | 8/2002 |
| JP | 2003-104220 | 4/2003 |
| JP | 2003-267248 | 9/2003 |
| JP | 2003-335253 | 11/2003 |
| JP | 2004-345468 | 12/2004 |

\* cited by examiner

ELECTRIC POWER STEERING DEVICE EQUIPPED WITH AUTOMATIC STEERING FUNCTION

CROSS REFERENCE TO RELATED DOCUMENT

The present application claims the benefit of Japanese Patent Application No. 2004-37765 filed on Feb. 16, 2004.

BACKGROUND OF THE INVENTION

1. Technical Field of the Invention

The present invention relates generally to an electric power steering device equipped with a steering assist motor to assist with steering of a steering wheel.

2. Background Art

Japanese Patent First Publication No. 2003-267248 discloses an electric power steering device which works to measure a steering torque of a steering shaft of an automotive vehicle and control an electric motor (i.e., a steering assist motor) as a function of the measured steering torque to produce a steering assist torque to the steering shaft.

Electric power steering devices of the type, as taught in the above publication, have the disadvantage that when the driver puts the vehicle into the garage at low speeds, making small turns, it takes a lot of time and effort on the part of the driver, resulting in the fatigue of the driver. Particularly, when the driver backs the vehicle into the garage, the driver needs to operate the steering wheel while securing the safety behind the vehicle. The driver may, thus, overturn or over-return the steering wheel, experiencing a difficulty in moving the vehicle into the garage correctly.

Recently, automotive vehicles which are equipped with a rear monitor camera or capable of being backed into the garage automatically using such rear monitor camera or rear sensor have been used, but however, resulting in increased costs of the vehicles.

SUMMARY OF THE INVENTION

It is therefore a principal object of the invention to avoid the disadvantages of the prior art.

It is another object of the invention to provide an electric power steering device for vehicles which is designed to minimize a driver's steering effort.

According to one aspect of the invention, there is provided an electric power steering device which may be employed in automotive vehicles. The electric power steering device comprises: (a) a motor working to produce a steering assist torque when a steering wheel of a vehicle is being rotated; (b) a torque sensor working to measure a steering torque; (c) a vehicle speed sensor working to measure a speed of the vehicle; (c) a steering velocity determining circuit working to determine a steering velocity of the steering wheel; (d) a motor control working to control an operation of the motor based on the steering torque, as measured by the torque sensor, and the speed of the vehicle, as measured by the vehicle speed sensor;

a decision-making circuit working to decide whether a condition parameter related to a preselected operating condition of the vehicle meets a given requirement or not; and (e) an automatic rotation control working to perform an automatic steering control to maintain the motor to produce the steering assist torque to rotate the steering wheel based on the steering velocity determined by the steering velocity determining circuit. When the decision-making circuit decides that the condition parameter has met the given requirement, the automatic rotation controller initiates the automatic steering control. Alternatively, when the decision-making circuit decides that the condition parameter has been shifted from the given requirement, the automatic rotation controller deactivates the automatic steering control.

For example, when a vehicle driver puts the vehicle into a garage at low speeds, making small turns, the electric power steering device serves to minimize a driver's steering effort.

In the preferred mode of the invention, when the steering torque has fallen within a given range, the decision-making circuit decides that the condition parameter has met the given requirement. For example, when the vehicle is traveling on an uneven road such as a dirt road, it may cause the steering wheel to be turned unintentionally, which requires a driver's steering effort. Therefore, a range of steering effort within which the driver is expected to have started to turn the steering wheel intentionally may be determined as the given range. This allows the automatic rotation control to perform the automatic steering control to add the steering assist torque to the steering wheel only as needed by the driver, thus minimizing the discomfort of the driver or possibility of accidents.

When the speed of the vehicle has fallen within a given range (e.g., 5 km/h or less), the decision-making circuit may decide that the condition parameter has met the given requirement.

When the steering velocity has fallen within a given range, the decision-making circuit may decide that the condition parameter has met the given requirement.

The electric power steering device may also include a steering angle sensor which works to measure a steered angle of the steering wheel. When the steered angle of the steering wheel has fallen within a given range, the decision-making circuit may decide that the condition parameter has met the given requirement.

The electric power steering device may also include a current sensor which works to measure an electric current flowing through the motor. When the electric current, as measured by the current sensor, has fallen within a given range, the decision-making circuit may decide that the condition parameter has met the given requirement.

The electric power steering device may also include an angular position determining circuit which works to determine an angular position of the steering wheel. When the angular position of the steering wheel has reached a predetermined position, the decision-making circuit may decide that the condition parameter has shifted from the given requirement. The predetermined position may be given by subtracting a given angle from a maximum steerable angle of the steering wheel.

When the steered angle of the steering wheel has reached a predetermined angle, the decision-making circuit may decide that the condition parameter has shifted from the given requirement. The predetermined angle may be given by subtracting a given angle from a maximum steerable angle of the steering wheel.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
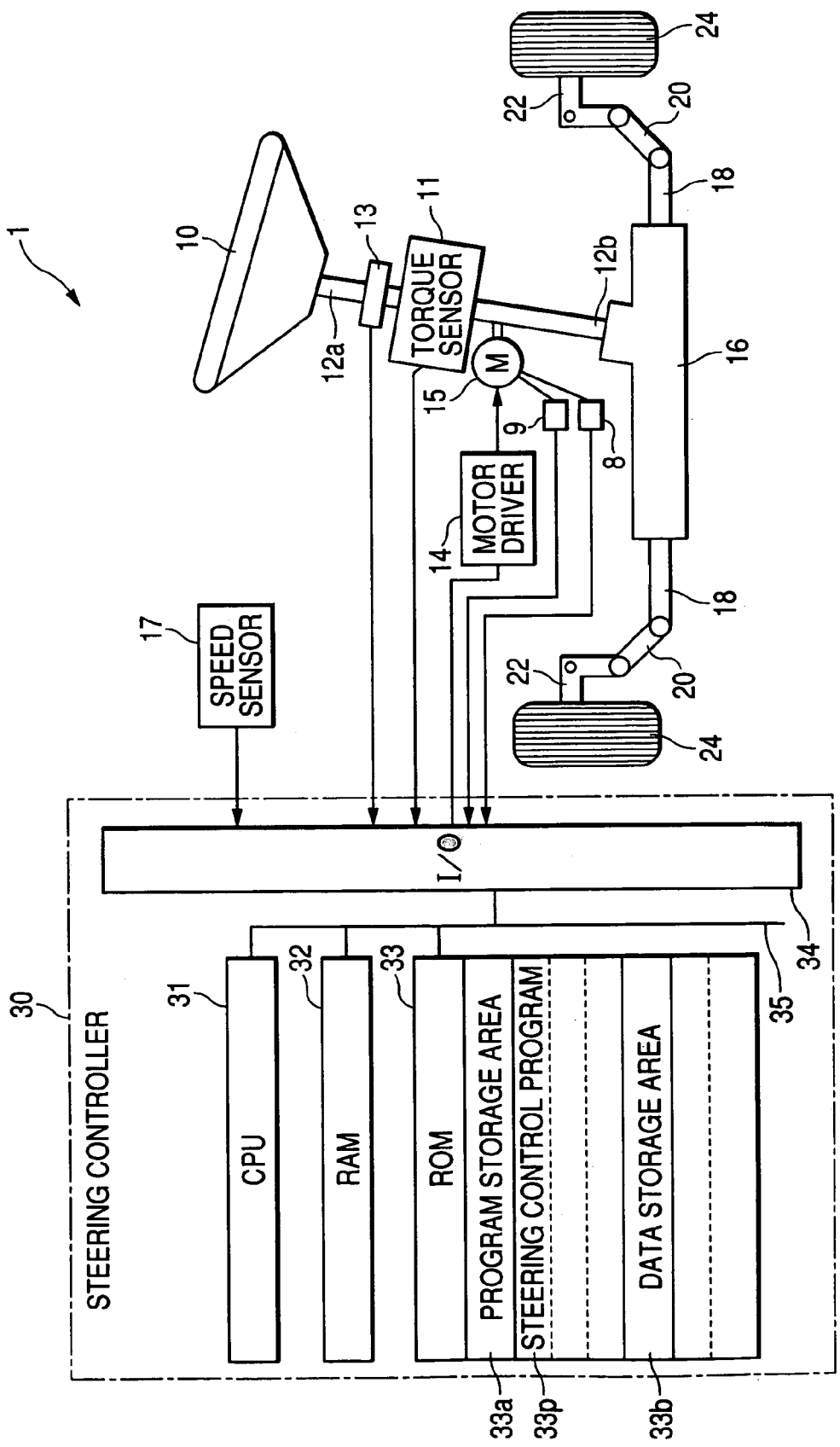
FIG. 1 is a view which shows a structure of an electric power steering device according to the invention.

Referring to the drawings, wherein like reference numbers refer to like parts in several views, particularly to FIG. 1, there is shown an electric power steering device 1 for automotive vehicles according to the invention.

A steering wheel 10 is connected to a steering shaft 12a. The steering shaft 12a is joined at a lower end thereof, as viewed in the drawing, to a torque sensor 11. The torque sensor 11 is joined at a lower end thereof to an upper end of a pinion shaft 12b. The pinion shaft 12b has fitted on a lower end thereof a pinion (not shown) which meshes with a rack bar 18 within a steering gear box 16. The rack bar 18 connects at ends thereof with ends of tie rods 20. The tie rods 20 connect at the other ends with road wheels 24 through knuckle arms 22. An electric motor 15 connects with the pinion shaft 12b through a gear (not shown), which constitutes the so-called column assist steering device.

The motor 15 may alternatively be joined coaxially with the rack bar 18 or installed within the steering gear box 16 to drive the pinion shaft 12b.

The torque sensor 11 works to measure a driver's steering effort on the steering wheel 10 and may be implemented by a known torque sensor made up of a torsion bar and a pair of sensors such as resolvers disposed apart from each other on a length of the torsion bar. Specifically, the torque sensor 11 is responsive to torque of the steering shaft 12a to provide a signal indicative thereof to a steering controller 30.

A steering angle sensor 13 is attached to the steering shaft 12a which works to measure a steered angle and a steering velocity of the steering shaft 12a using a steering velocity determining circuit. The steering angle sensor 13 may be implemented by a know angular sensor made up of a rotary encoder and a resolver. The steering angle sensor 13 outputs a sensor signal to the steering controller 30. The steering controller 30 uses the sensor signal and determines the steered angle and the steering velocity of the steering shaft 12a. The steering velocity is given by a variation in the steered angle per unit time (e.g., one (1) sec.)

The electric power steering device 1 also includes a current sensor 8, an angular position sensor 9, and a vehicle speed sensor 17. The angular position sensor 9 is implemented by a known position sensor made up of a rotary encoder and a resolver and works to measure an angular position of a rotary shaft of the motor 15 and output a signal indicative thereof to the steering controller 30. The motor 15 is connected to the pinion shaft 12b through a speed reduction gear mechanism (not shown). The output of the angular position sensor 9 is, therefore, also a function of an angular position of the pinion shaft 12b or the steering wheel 10. The vehicle speed sensor 17 is implemented by a known speed sensor including a rotary encoder etc. and works to measure the speed of the vehicle and output a signal indicative thereof to the steering controller 30.

The steering controller 30 consists essentially of a CPU 31, a RAM 32, a ROM 33, an I/O device 34 (i.e., an input/output interface), and a bus line 35 electrically connecting them. The CPU 31 reads programs and data out of the ROM 33 and the RAM 32 and performs given control tasks. The ROM 33 includes a program storage area 33a and a data storage area 33b. The program storage area 33a retains therein a steering control program 33p. The data storage area 33b retains therein data for use in executing the steering control program 33p.

The steering controller 30 works to execute the steering control program 33p stored in the ROM 33 to determine a drive torque to be produced by the motor 15 as a function of the torque, as measured by the torque sensor 11, and the steering velocity, as measured by the steering angle sensor 13 and apply a voltage to the motor 15 through a motor driver 14 which is required to create the determined drive torque in the motor 15. The motor 15 may be of any type usable in the electric power steering device 1 and is implemented, for example, by a DC motor or a brushless motor.

Figure 2:
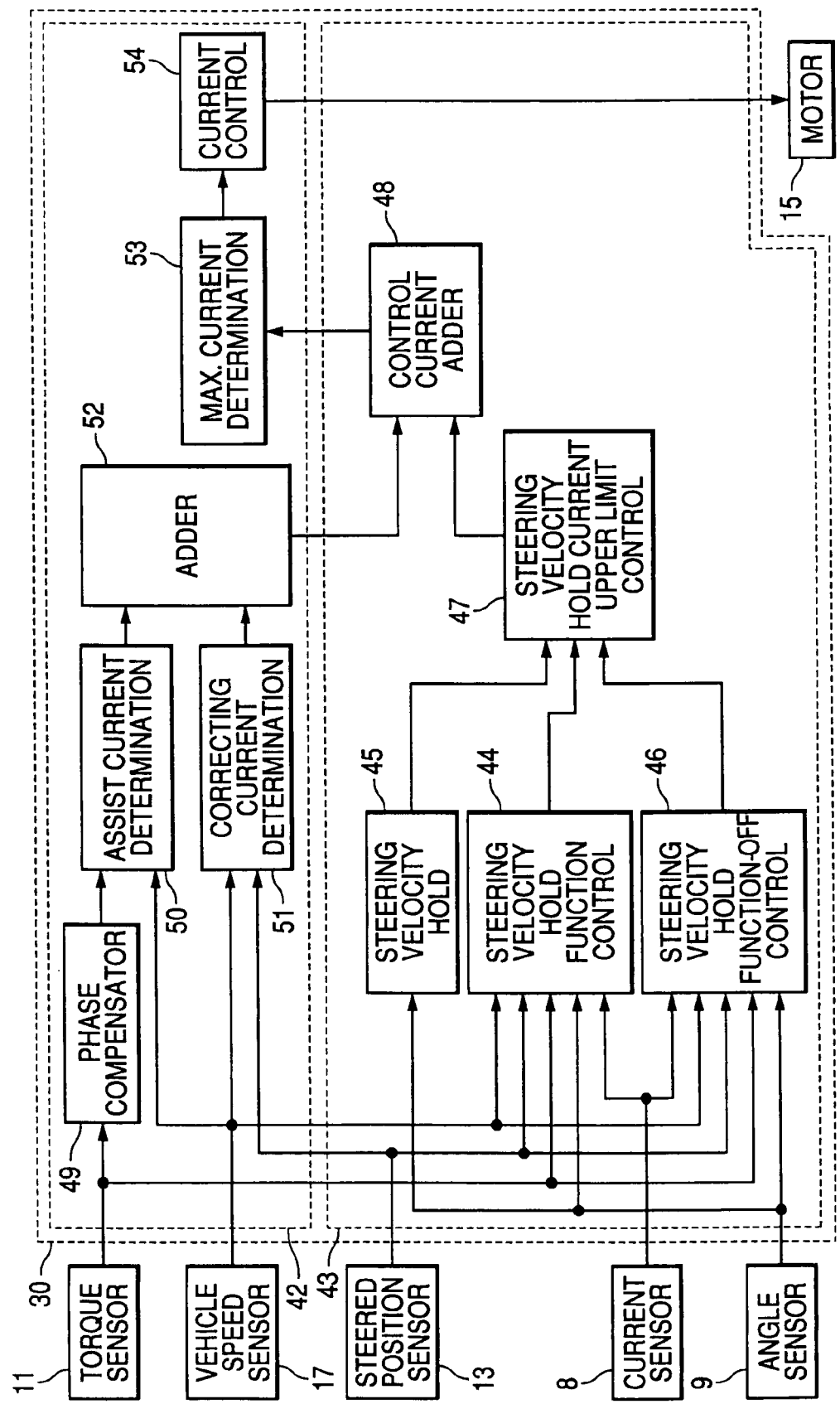
FIG. 2 is a block diagram which shows a circuit structure of a steering controller installed in the electric power steering device of FIG. 1.

FIG. 2 is a block diagram showing a circuit structure of the steering controller 30 which is designed to perform a motor control task and other tasks in the steering control program 33p cyclically during an on-state of the electric power steering device 1.

The steering controller 30 consists essentially of a steering assist controlling circuit 42 which includes an automatic rotation control and a steering velocity holding circuit 43 which includes a decision making circuit. The steering assist controlling circuit 42 includes a phase compensating block 49, an assist current determining block 50, an correcting current determining block 51, a current adder block 52, a maximum current determining block 53, and a current control block 54. The steering velocity holding circuit 43 includes a steering velocity holding function control block 44, a steering velocity holding control block 45, a steering velocity holding function-off control block 46, a steering velocity holding current upper limit control block 47, and a control current adder block 48.

The steering assist controlling circuit 42 works to operate, like that in known electric power steering devices. Specifically, the steering assist controlling circuit 42 determines, in the assist current determining block 50, a steering assist current to be applied to the motor 15 as a function of a phase compensating factor, as calculated in the phase compensating block 49, and a vehicle speed, as measured by the vehicle speed sensor 17. The correcting current determining block 51 works to determine a current (i.e., a correction factor) as a function of the steering velocity measured by the steering angle sensor 13 for correcting the steering assist current, as determined by the assist current determining block 50. The current adder block 52 functions to add the correcting current provided by the correcting current determining block 51 to the steering assist current provided by the assist current determining block 50. Japanese Patent First Publication No. 8-91236 discloses an example of operation of the steering assist controlling circuit 42.

The control current adder block 48 works to add outputs of the current adder block 52 and the steering velocity holding current upper limit control block 47 to produce a control current. the maximum current determining block 53 functions to determine whether the control current lies within a permissible range or not. If not, the maximum current determining block 53 selects a predetermined upper limit as the control current. The current control block 54 which is a part of steering controller 30 functions as a motor control to determine a voltage required to create the control current and apply it to the motor 15.

The steering velocity holding function control block 44 is designed to use at least one of outputs of the torque sensor 11, the vehicle speed sensor 17, the steering angle sensor 13, the current sensor 8, and the angular position sensor 9 as a condition parameter for use in determining whether a steering velocity holding function-on flag, as will be described later in detail, is to be switched to an on-state or not. Specifically, when the condition parameter has met a given requirement, for example, it has fallen in a given range, the steering velocity holding function control block 44 works to switch the steering velocity holding function-on flag to the on-state to initiate the steering velocity holding control which regulate the torque applied by the motor 15 to the pinion shaft 12b so as to keep the steering velocity of the steering wheel 10 substantially constant. A combination of two or more of the outputs of the torque sensor 11, the vehicle speed sensor 17, the steering angle sensor 13, the current sensor 8, and the angular position sensor 9 may be used, as described above, as condition parameters. In this case, when all the condition parameters have fallen in given ranges, respectively, the steering velocity holding function control block 44 switches the steering velocity holding function-on flag to the on-state.

When the steering velocity holding function-on flag is switched to the on-state, the steering velocity holding control block 45 functions to determine a steering velocity holding current, as required for a steering velocity feedback control to hold an instantaneous value of the steering velocity to be constant.

When at least one of the outputs of the torque sensor 11, the vehicle speed sensor value 17, the steering angle sensor 13, the current sensor 8, and the angular position sensor 9 has fallen out of a corresponding one of the given ranges during the on-state of the steering velocity holding function-on flag, the steering velocity holding function-off control block 46 works to output a steering velocity holding function-off signal which turns off or deactivates the steering velocity holding function.

The steering velocity holding current upper limit control block 47 functions to select a maximum value of rated current of the motor 15 as the upper limit of current to be applied to the motor 15 when the steering velocity holding function-on flag is in the on-state and alternatively decrease the upper limit of the current gradually to a value matching an instantaneous degree of steering motion if the steering velocity holding function-on flag is in the off-state.

Figure 3:
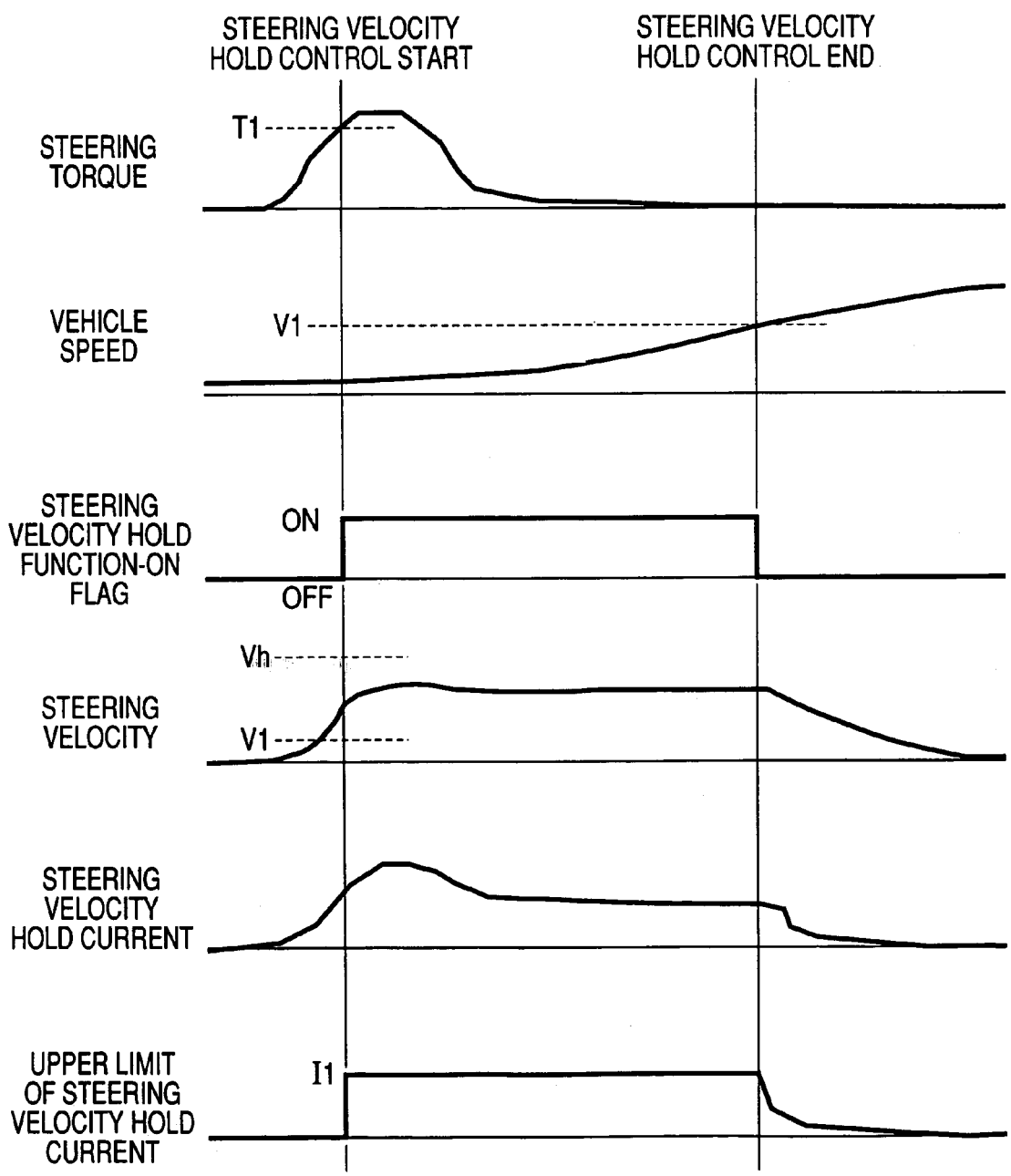
FIG. 3 is a time chart which demonstrates an operation of a steering velocity holding control in the electric power steering device of FIG. 1.

FIG. 3 shows an example of an operation of the steering velocity holding control (i.e., the steering velocity holding function) to be performed by the steering controller 30.

In the example, the steering torque, as measured by the torque sensor 11, and the vehicle speed, as measured by the vehicle speed sensor 17, are employed as the condition parameters used for activating the steering velocity holding function. The steering velocity holding function control block 44 and the steering velocity holding function-off control block 46 monitor instantaneous values of the steering torque measured by the torque sensor 11 and the vehicle speed measured by the vehicle speed sensor 17 at all times. When the steering torque exceeds a level T1 selected within a range, for example, 2 to 3 Nm, and the vehicle speed is lower than a value V1 selected within a range of, for example, 5 to 10 km/h, the steering velocity holding function control block 44 places the steering velocity holding function-on flag in the on-state to start the steering velocity holding control. The steering velocity holding control block 45 then determines the steering velocity holding current, as described above, required to keep the steering velocity at the start of the steering velocity holding control constant.

When the vehicle speed exceeds the level V1, the steering velocity holding function control block 44 switches the steering velocity holding function-on flag to the off-state to terminate the steering velocity holding control. In order to eliminate a sudden change in speed of the motor 15 with which the vehicle driver usually feels uncomfortable, the steering velocity holding current upper limit control block 47 works to decreases the upper limit of current to be applied to the motor 15 gradually to zero (0). This causes the steering velocity holding current, as determined in the steering velocity holding control block 45, to be decreased at a slow rate.

The steering velocity holding function control block 44 may be so designed as to switch the steering velocity holding function-on flag to the off-state to terminate the steering velocity holding control when the vehicle driver has turned the steering wheel 10 with greater torque during execution of the steering velocity holding function, so that the steering torque, as measured by the torque sensor 11, exceeds a preselected level (e.g., level T1).

The steering velocity holding function control block 44 may alternatively be so designed as to switch the steering velocity holding function-on flag to the off-state to terminate the steering velocity holding control when the vehicle driver has turned the steering wheel 10 at a speed which will cause the steering velocity (i.e., a variation in output of the steering angle sensor 13 per unit time) to shift out of a permissible range of, for example, 60 deg./sec. to 180 deg./sec. during execution of the steering velocity holding control.

The steering velocity holding function control block 44 may also be so designed as to switch the steering velocity holding function-on flag to the off-state to terminate the steering velocity holding control when the current flowing through the motor 15, as measured by the current sensor 8 or a variation thereof has shifted out of a predetermined permissible range during execution of the steering velocity holding control.

Further, the steering velocity holding function control block 44 may be so designed as to switch the steering velocity holding function-on flag to the off-state to terminate the steering velocity holding control when the angular position, as measured by the angular position sensor 9 has shifted out of a predetermined permissible range during execution of the steering velocity holding control.

There is generally known a stroke end hit safety control which works to decrease a steering assist torque to be produced by a steering assist electric motor or stop such torque production when an angular position of the steering wheel exceeds a given limit for the purposes of improving the durability of the motor and saving the power consumption thereof. The steering controller 30 is equipped with this function. This will be described below.

The steering wheel 10 is, like a typical one, designed to be allowed only to rotate a given number of times (e.g., two times) from a neutral position in either direction. Such number of times depends upon the type of vehicles. A limit of an angular range in which the steering wheel 10 is allowed to rotate in each direction is generally referred to as a stroke end. When the angular position of the steering wheel 10 falls within a range defined around a motor stop initiating angular position, as will be described later in detail, the steering controller 30 initiates steering motion stop instructions provided in the steering control program 33p cyclically during the on-state of the electric power steering device 1.

When the vehicle speed is greater than a preselected one, and the steering torque measured by the torque sensor 11 lies within a range near zero (0) Nm, the steering controller 30 determines that the vehicle is traveling straight or the steering wheel 10 is in a neutral position and samples an output of the steering angle sensor 13 to determine an angular position of the steering wheel 10, as measured by the steering angle sensor 13, as a reference position.

When the steering wheel 10 is turned, and the above described condition parameters have fallen within the given ranges to launch the steering velocity holding control, the electric motor 15, as described above, starts to add a steering assist torque to the steering wheel 10, so that it may continue to rotate automatically even in the absence of driver's steering effort. The steering controller 30 then samples an output of the steering angle sensor 13 and calculates a deviation thereof from the reference position to determine it as an actual angular position of the steering wheel 10.

Typically, when a power supply to an electric motor is cut off, the electric motor undergoes the force of inertia, so that it continues to rotate for a while. The same is true for the electric motor 15. The steering wheel 10, therefore, does not stop rotating immediately after stop of the motor 15. The force of inertia acting on the motor 15 usually depends upon the number of revolutions thereof per unit time (i.e., the speed of the motor 15). A undesirable mechanical impact transmitted to the steering wheel 10 arising from a hit against the stroke end may be eliminated by mathematically selecting the above described motor stop initiating angular position so that an angular position of the motor 15 where after the upper limit of current supplied to the motor 15 is decreased to zero (0), the motor 15 continues to be rotated by the force of inertia and then stops will be at least the stroke end.

The force of inertia acting on the motor 15 depends upon the speed of the motor 15 during execution of the steering velocity holding control. An angular range within which the motor 15 will continue to be rotated by the force of inertia may, therefore, be calculated. A rate at which the upper limit of current to be supplied to the motor is predetermined in the steering controller 30. Consequently, using these parameters, an angular position of the motor 15 where the upper limit of current being supplied to the motor 15 will be zero (0) may be determined. By back-calculation from this position, an angular position (i.e., the above motor stop initiating angular position) of the motor 15 where the decreasing of the upper limit of current to be supplied to the motor 15 should be initiated may be determined.

When the steering controller 30 samples an output of the angular position sensor 9 and determines that an angular position of the motor 15 has reached the motor stop initiating angular position, the steering velocity holding function control block 44 switches the steering velocity holding function-on flag to the off-state to terminate the steering velocity holding control. This avoids a hit of the steering wheel 10 on the stroke end with which the drive usually feels uncomfortable.

If, however, the angular position of the steering wheel 10 (i.e., the angular position of the motor 15) has already reached the motor stop initiating angular position at a time the steering velocity holding control is required to be initiated, the steering controller 30 does not launch the steering velocity holding control.

In the stroke end hit safety control during execution of the steering velocity holding function, when the steering wheel 10 has reached an angular position corresponding to the motor stop initiating angular position, the steering velocity holding function control block 44 may terminate the steering velocity holding control.

The stroke end hit safety control may alternatively be initiated during execution of the steering velocity holding function in the following manner. Specifically, an angular position of the steering wheel 10 where the upper limit of current being supplied to the motor 15 will be zero (0) is determined using an output of the steering angle sensor 13 (i.e., an actual angular position of the steering wheel 10) and the force of inertia acting on the motor 15. Using the rate at which the upper limit of current to be supplied to the motor which is, as described above, predetermined in the steering controller 30, an angular range of the steering wheel 10 within which after the upper limit of current to be supplied to the motor 15 starts to be decreased, the steering wheel 10 will continue to rotate and then stop is determined. When an actual angular position of the steering wheel 10 has reached the above range, the steering velocity holding function control block 44 terminates the steering velocity holding control.

In the stroke end hit safety control during execution of the steering velocity holding function, the motor stop initiating angular position may alternatively be determined in the following manner. A maximum steerable angle that is a range between the reference position of the steering wheel 10 and an angular position reached by the steering wheel 10 when turned fully in the right or left direction is calculated. From this angle, an angular range of the motor 15 within which after the upper limit of current to be supplied to the motor 15 starts to be decreased, the motor 15 will continue to rotate and then stop is subtracted to determine the motor stop initiating angular position.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An electric power steering device for a vehicle comprising:

a motor working to produce a steering assist torque when a steering wheel of a vehicle is being rotated in a rotational direction, the steering wheel assist torque urging rotation of the steering wheel in the rotation direction;

a torque sensor working to measure a steering torque;

a vehicle speed sensor working to measure a speed of the vehicle;

a steering velocity determining circuit working to determine a steering velocity of the steering wheel;

a motor control working to control an operation of said motor based on the steering torque, as measured by said torque sensor, and the speed of the vehicle, as measured by said vehicle speed sensor;

a decision-making circuit working to decide whether condition parameters related to preselected operating conditions of the vehicle meet given requirements or not; and an automatic rotation controller working to perform an automatic steering control to maintain said motor to produce the steering assist torque to rotate the steering wheel in the rotation direction based on the steering velocity determined by said steering velocity determining circuit and the speed of the vehicle; wherein when the steering torque and the speed of the vehicle have fallen within given ranges, respectively, said decision-making circuit deciding that the condition parameters have met the given requirements, and said automatic rotation controller including means for initiating the automatic steering control to maintain said motor to produce the steering assist torque to rotate the steering wheel in the rotation direction and means for holding the steering velocity of the steering wheel constant; and when said decision-making circuit decides that the condition parameters have been shifted from the given requirement, said automatic rotation controller deactivating the automatic steering control.

2. An electric power steering device as set forth in claim 1, wherein when the steering torque has fallen within a given range, said decision-making circuit decides that the condition parameter has met the given requirement.

3. An electric power steering device as set forth in claim 1, wherein when the speed of the vehicle has fallen within a given range, said decision-making circuit decides that the condition parameter has met the given requirement.

4. An electric power steering device as set forth in claim 1, wherein when the steering velocity has fallen within a given range, said decision-making circuit decides that the condition parameter has met the given requirement.

5. An electric power steering device as set forth in claim 1, further comprising a steering angle sensor which works to measure a steered angle of the steering wheel, and wherein when the steered angle of the steering wheel has fallen within a given range, said decision-making circuit decides that the condition parameter has met the given requirement.

6. An electric power steering device as set forth in claim 1, further comprising a current sensor which works to measure an electric current flowing through said motor, and wherein when the electric current, as measured by said current sensor, has fallen within a given range, said decision-making circuit decides that the condition parameter has met the given requirement.

7. An electric power steering device as set forth in claim 5, wherein when the steered angle of the steering wheel has reached a predetermined angle, said decision-making circuit decides that the condition parameter has shifted from the given requirement.

8. An electric power steering device as set forth in claim 7, wherein the predetermined angle is given by subtracting a given angle from a maximum steerable angle of said steering wheel.

9. An electric power steering device as set forth in claim 1, further comprising an angular position determining circuit which works to determine an angular position of the steering wheel, and wherein when the angular position of the steering wheel has reached a predetermined position, said decision-making circuit decides that the condition parameter has shifted from the given requirement.

10. An electric power steering device as set forth in claim 9, wherein the predetermined position is given by subtracting a given angle from a maximum steerable angle of said steering wheel.

\* \* \* \* \*

UNITED STATES PATENT AND TRADEMARK OFFICE
CERTIFICATE OF CORRECTION

PATENT NO.       : 7,628,247 B2
APPLICATION NO.  : 11/058649
DATED            : December 8, 2009
INVENTOR(S)      : Jirou Hayashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this

Second Day of November, 2010

David J. Kappos
*Director of the United States Patent and Trademark Office*